Patented Aug. 7, 1923.

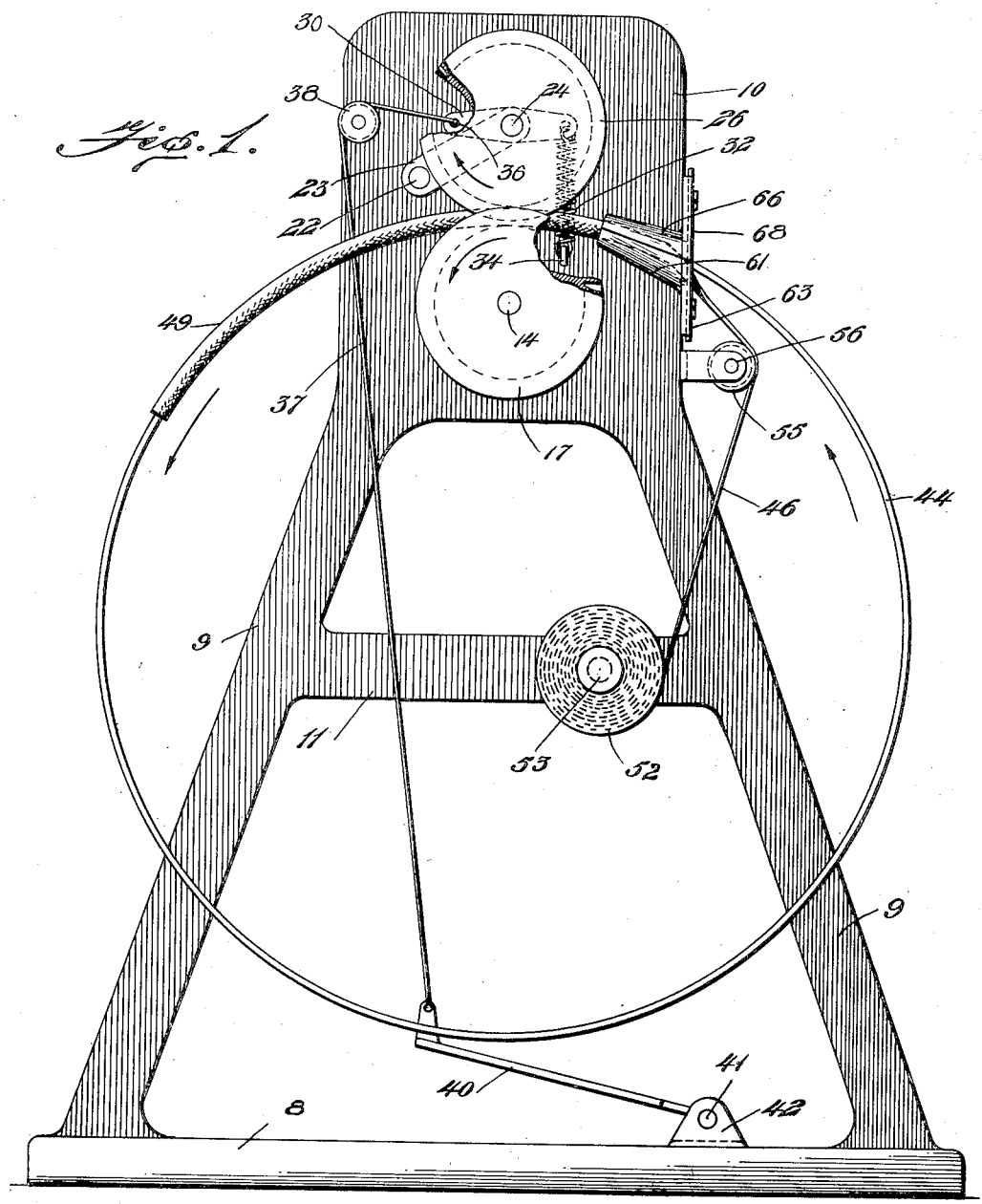

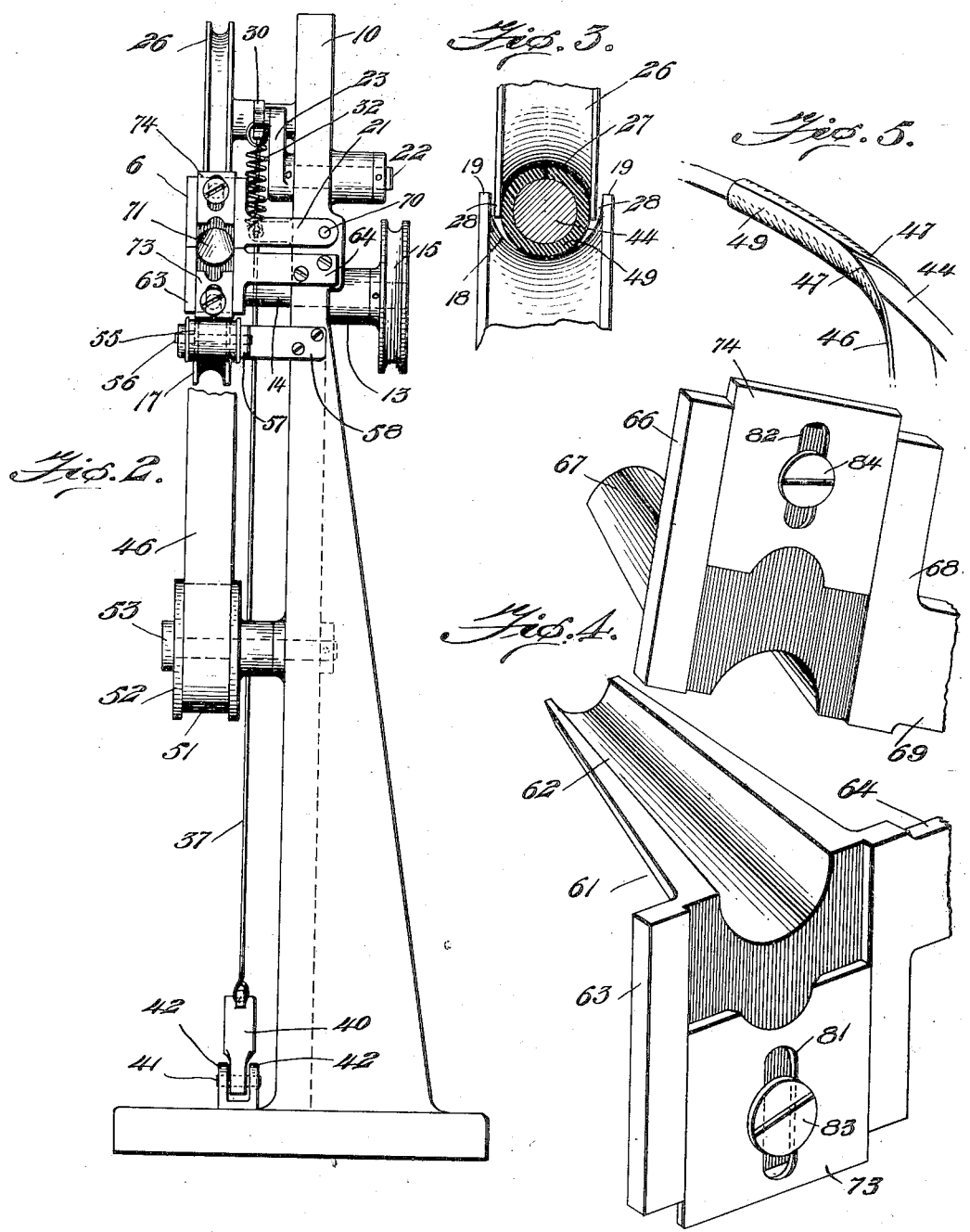

1,463,868

UNITED STATES PATENT OFFICE.

MAGLOIRE BRODEUR, OF PROVIDENCE, RHODE ISLAND.

MACHINE FOR COVERING TIRE RINGS.

Application filed October 10, 1921. Serial No. 506,633.

*To all whom it may concern:*

Be it known that I, MAGLOIRE BRODEUR, a subject of the King of Great Britain, residing at Providence, in the county of Providence and State of Rhode Island, have invented certain new and useful Improvements in Machines for Covering Tire Rings, of which the following is a specification.

My invention relates to a machine for covering a tire reinforcement ring.

These metal rings which are located in the beads of a tire are initially encased in a rubber covering and thereafter incorporated in the material of the tire bead. Heretofore the rings were initially covered by helically winding in overlapping coils a rubber strip on the metal ring. This was disadvantageous in creating an uneven exterior surface, and there was a tendency in the coils to separate or loosen.

The essential objects of my invention are to overcome these disadvantages and to insure a tight, uniform and permanent application of the covering to the wire; and to provide means for smoothing the completed reinforcing member.

To the above ends primarily my invention consists in such parts and in such combinations of parts as fall within the scope of the appended claims.

In the accompanying drawings which form a part of this specification,

Figure 1 is a front elevation of a machine embodying my invention,

Figure 2, a side elevation of the same,

Figure 3, a fragmentary side elevation of the adjacent portions of the covering rolls showing the rod and covering engaged thereby in transverse section, Figure 4, a fragmentary perspective view of the strip guide member, and Figure 5, a like view of the rod with the rubber covering partially applied thereto.

Like reference characters indicate like parts throughout the views.

The framework of my machine may be of any form best adapted for carrying the operative parts in the form thereof herein shown, it comprises a base 8, and legs 9, supporting a body or head 10, the legs 9 carrying a cross piece 11.

Revolubly mounted in a bearing 13 in the body is a main shaft 14 driven by a grooved pulley 15 from any convenient source of power. Fast to the shaft is a driving feed die or roll 17 provided with a peripheral groove 18 between resultant flanges 19. Above the main shaft in a bearing 21 on the body is a rock shaft 22 having a crank arm 23 carrying upon its end a fixed shaft or stud 24 upon whose end is rotatably mounted a driven die or presser roll 26 provided with a peripheral groove 27 forming resultant flanges or shoulders 28. Rigid with the member 24 intermediate its length is an oblong plate 30 having fast to one end the upper end of a spring 32 whose lower end is attached to a pin 34 on the lower portion of the body. Attached to the outer end of the member 30 through a hole 36 is a cord or flexible member 37 which passes over a guide roller 38 on a pin 39 on the body above the rock shaft 22. The lower end of the cord is attached to the free end of a pedal or foot lever 40 pivoted on a pintle 41 in lugs 42 on the base. The spring 32 normally forces the roller 26 towards the roller 17, and the former roller 26 may be elevated for the introduction or removal or work or for any other purpose by depressing the pedal 40 which acts through the cord 37.

The stiffening or reinforcing ring 44 which is to be covered is inserted between the rolls 17 and 26 after one end of a ribbon, strip, or tape 46 of uncured or soft rubber has been manually wrapped around it with the edges 47 of the strip abutting against each other. The inherent adhesiveness of the soft rubber tends to unite the edges of the strip, and the pliability of the material also assists to form the strip around the ring and retain it in position thereon. The initial application of the strip is shown in Figure 5 wherein 49 represents the tube or sheath of rubber. With the sheath thus started upon the ring this wrapper portion is introduced between the rolls. The strip 46 is part of a coil 51 on a supply roll 52 mounted on a pin 53 in the cross piece 11. The strip passes over a guide roll 55 mounted on a pintle 56 in bracket ears 57 on an arm 58 fast to the body. Thence the strip on its way to the rolls 17 and 26 passes through the folding guide member 60 now to be described.

This member is conical or tapering in form and is longitudinally divided into two sections. The lower section 61 comprises a tapering transversely curved or semitubular guide portion 62 integral with an attaching plate 63 having a lateral extension 64 fastened to the body by screws 65. The upper section 66 comprises a similar guide portion 67 upon a plate 68 having an extension 69 pivotally attached by a pin 70 to the body. The edges of the guide portions 62 and 67 normally register with each other as the member 66 rests by gravity on the member 61, so that a tapering or conical passage 71 is afforded for the strip 46. The guide diminishes in diameter towards the presser rolls and terminates adjacent the latter. The end diameter of the bore is preferably slightly larger than the external diameter of the sheath 49 which this guide initially forms preparatory to the squeezing or pressing action of the rolls. Both the sheath and the ring are advanced together by the said rolls, and in this instance the friction of the rolls upon the work is increased by roughening the grooved faces 18 and 27 of the rolls. At the end of a single rotation of the ring 44 the strip 46 is manually severed by a knife or otherwise.

The thickness of the roll 17 is shown greater than that of the roll 26 so that the flanges 28 of the latter enter the groove 18 some distance between the flanges 19; and while the groove 27 is semicircular in cross section and conforms with the exterior dimension of the sheath 49, it will be observed that the flanges 28 are extended beyond a semicircle and embrace practically more than half the face of the sheath. This construction insures a more snug and even engagement of the sheath with the ring.

It will be observed that the annular form of the member 44, and its function as a circularly movable mandrel impelled by the roller die 17 and cooperating with the roller dies 17 and 26 makes this member a constituent part of the machine.

After the removal of the sheathed ring it is subjected in a mould to vulcanization which sometimes leaves a slight longitudinal fin on opposite portions of the rubber covered annulus. For removing this fin the annulus may be remounted in the machine, after elevating the roll 26 and the guide section 66 temporarily for this purpose, and then operating the machine in the usual manner to rotate the annulus in conjunction with the following parts. Plates 73 and 74 are slidable in vertical guideways 75 and 76 in the faces of plates 63 and 68 respectively. The adjacent or inner ends of the plates have centrally disposed arcuate cavities 78 and 79 respectively provided with thin or knife edges so that the plates constitute blades. The blades have respectively vertical slots 81 and 82 to admit set screws 83 and 84 respectively which engage in the respective plates. Normally these plates are as shown, retracted from the path of the work passing through the guide, but when the fin removing operation is to be performed these plates are adjusted towards each other and the orifice 71 so as to be in the path of the fins which are scraped or cut away as the annulus is advanced by the rolls 17 and 26.

It is obvious that many changes in details of construction within the spirit of my invention may be made. The description of the machine has been given in detail merely for clearness of understanding, and no undue limitation should be understood therefrom.

I claim:—

1. In a machine of the character described, a frame, a driving shaft in the frame, a die fast to the shaft provided with a peripheral groove, a rock shaft mounted in the frame adjacent the driving shaft, a crank arm on the rock shaft, a stud on the arm, a die on the stud provided with a groove adapted to register with the first groove, a plate on the stud, a spring on the plate attached to the frame for forcing the second die towards the first die, a guide on the frame adjacent the plate, and a cord on the plate engaging the guide.

2. In a machine of the character described, a frame, a driving shaft on the frame, a die fast to the shaft provided with a peripheral groove, a rock shaft mounted in the frame, an arm on the rock shaft, a stud on the arm, a die on the stud provided with a groove adapted to register with the first groove, a plate attached to the stud, a spring engaging the plate and frame, a pedal on the frame, and a flexible member connecting the plate and pedal.

3. In a machine of the character described, a frame, shafts in the frame, dies on the shafts provided with peripheral grooves registering with each other, and a guide section adjacent the dies comprising a plate, a semitubular guide portion upon the plate, and a lateral extension on the plate fast to the frame, and a guide section comprising a plate in the plane of the first plate, a semitubular guide portion resting on the first guide portion, and a lateral extension on the plate pivotally attached to the frame.

4. In a machine of the character described, a frame, shafts in the frame, dies on the shafts provided with grooves registering with each other, a guide section adjacent the dies comprising a plate, a semitubular guide portion on the plate, and an extension on the plate fast to the frame, a guide section comprising a plate in the plane of the first plate, a semitubular guide portion engaging the first guide portion, and a lateral extension on the plate pivotally attached to the frame, blades slidably mounted on the plates in alignment with each other and with the semitubular portions and provided with oblong slots, and set screws in the plates engaging the blades through the slots.

In testimony whereof I have affixed signature.

MAGLOIRE BRODEUR.